United States Patent Office 3,293,113
Patented Dec. 20, 1966

3,293,113
CARBONATION OF PULPING LIQUOR WITH SUBSEQUENT PARTIAL OXIDATION OF STRIPPED HYDROGEN SULFIDES
Emil Teodor Venemark, deceased, late of Ornskoldsvik, Sweden, by Rut Venemark, legal representative, Malmo, Sweden, assignor to Mo Och Domsjo Aktiebolag, Ornskoldsvik, Sweden, a limited company of Sweden
No Drawing. Filed Dec. 13, 1963, Ser. No. 330,501
Claims priority, application Sweden, Dec. 17, 1962, 13,595/62
7 Claims. (Cl. 162—30)

The present invention relates to cellulose manufacture by the sulfate method and is more particularly concerned with a process in the preparation of a polysulfide-containing cooking liquor.

In the manufacture of cellulose pulp by the sulfate method, it is for economical reasons necessary to recover the alkali from the spent liquor. When cooking with a high proportion of polysulfide in the cooking liquor, which involves great advantages, it is necessary to remove in one way or another a portion of the sulfide of the circulating liquor so that a portion of the sodium sulfide obtained by combustion of the black liquor is converted into free sulfur, which is reused for making sodium polysulfide. In the digestion, a major portion of the polysulfide sulfur is converted into sulfide and thiosulfate and is recovered, apart from any losses, mainly as sulfide in the melt resulting from the combustion of the evaporated residual black liquor.

In the recovery process, it has been found suitable to work up the green liquor, i.e. the solution of sodium sulfide, sodium carbonate and minor amounts of other sodium salts, obtained by dissolving the melt from the combustion of the black liquor. One possible method consists in introducing carbon dioxide into the green liquor, whereby hydrogen sulfide is obtained, which is subsequently converted into sulfur. Even if the green liquor worked up has previously been enriched in sulfide, a great amount of carbon dioxide is consumed for driving off hydrogen sulfide. A part thereof is consumed to convert the carbonate and the sulfide of the solution into sodium hydrogen carbonate and sodium hydrogen sulfide. If suitable equipment is used, this conversion can be carried very far without any hydrogen sulfide leaving the solution. In the reaction it has been found highly advantageous to use a carbon dioxide gas having a high content of carbon dioxide and obtainable at low cost. The oxygen content of the carbon dioxide gas should also be as low as possible, since sulfide solutions are readily oxidised by oxygen, and this takes place at a rate which becomes higher as the alkalinity of the solution becomes lower.

The present invention relates to a process for removal of hydrogen sulfide from a sulfide-containing solution by the aid of carbon dioxide and subsequent oxidation of the hydrogen sulfide to form elemental sulfur, which process comprises using air for the oxidation and dissolving from the combustion gas, after separation of the sulfur, a major portion of the carbon dioxide in a solvent and then, if necessary, removing remaining hydrogen sulfide by washing with a solution containing sodium sulfide or by other treatment known per se, before the combustion gas is discharged, while the solvent is allowed to give off the absorbed carbon dioxide and is then used to absorb a further quantity of carbon dioxide.

The partial oxidation is suitably carried out with a deficit of air, so that carbon dioxide obtains a low content of oxygen or other combustion sustaining gases. The unreacted hydrogen sulfide is suitably returned to the apparatus for driving off hydrogen sulfide or to a particular device for pretreatment by carbonatization.

Oxidation by air is suitably carried out in at least two steps with addition of air in each step and cooling of the gas between the steps.

With an almost complete removal of hydrogen sulfide from a sulfide solution with carbon dioxide, there will be obtained a gas consisting mainly of carbon dioxide and usually less than 40% by volume of hydrogen sulfide. The gas can be partially burnt in a Claus furnace to form water and sulfur. According to this invention, the gas is treated, after a partial combustion with air in a Claus furnace and separation of the resulting sulfur, with a carbon dioxide absorbing substance such as a solution of alkali metalcarbonate or ethanolamine, and is then washed with a solution of sodium sulfide so that any remaining hydrogen sulfide is absorbed in the solution of sodium sulfide. The absorbed carbon dioxide which also contains small amounts of hydrogen sulfide, is driven off from the absorbent solution as carbon dioxide gas almost free from other oxygen-containing compounds, whereupon the absorbent solution is used to absorb additional carbon dioxide. The carbon dioxide is supplied to the apparatus for removing hydrogen sulfide to drive off additional hydrogen sulfide and, when necessary, is mixed therewith so that a concentration suitable for oxidation is obtained.

Due to the above described treatment of the combustion gas from the Claus furnace, the combustion can be carried out with excess of hydrogen sulfide, so that a combustion gas having a very low content of oxygen-containing gases other than carbon dioxide is obtained. The hydrogen sulfide is partly absorbed by the solvent for carbon dioxide, and the hydrogen sulfide driven off in the carbon dioxide removing step is absorbed by the green liquor, when the carbon dioxide containing gas is introduced thereinto. The presence of other oxygen-containing gases in the carbon dioxide gas gives rise to complications. Thus, e.g., sulfur dioxide is absorbed irreversibly by the absorbent solution, so that this must be replaced or purified.

The advantage of recovering the carbon dioxide from the partial oxidation of the hydrogen sulfide is not only that the oxidation can be carried out with a deficit of oxygen but also that this gas has a substantially higher proportion of carbon dioxide than other gases available in a sulfate cellulose plant. If there is supplied to a Claus furnace a gas comprising 90 parts by volume of carbon dioxide and 10 parts by volume of hydrogen sulfide, 50 parts of air are required for the combustion and an effluent gas comprising 60% of carbon dioxide is obtained. This gas is suitably treated in countercurrent with the absorbent. Differences in temperature and/or pressure can be utilized for carrying out the absorption and driving off operations.

The hydrogen sulfide proportion of the residual gas from the absorption is so low that it can be recovered before the gas is discharged in other ways, e.g. by combustion or by the Ferrox process or by the aid of gas purifying compound.

The invention is illustrated but not limited by the following example.

*Example*

A factory produces per hour 20 metric tons of sulfate cellulose pulp cooked with a liquor comprising 70 kg. of polysulfide sulfur per metric ton of pulp and possibly other types of sulfate pulp. The green liquor obtained by dissolving the melt from the combustion of black liquor was pretreated in a vessel with a carbon dioxide containing residual gas obtained as described below. Thereby, the hydrogen sulfide and the major portion of the carbon dioxide of the residual gas were removed from the gas, which was then discharged to the atmosphere. The pretreated green liquor contained per liter 60 g. $Na_2O$ as sodium hydrogen sulfide and 60 g. $Na_2O$ as sodium hydrogen carbonate together with 10 g. $Na_2O$ as other sodium salts and had a temperature of 70° C. The treated solution was passed to a stripping column, wherein it was treated stepwise in countercurrent with a gas obtained as described below and comprising about 1% by volume of hydrogen sulfide, about 98% by volume of carbon dioxide and about 1% by volume of inert gases. The solution was treated at a rate of 0.8 cubic meter of solution per minute. After carbon dioxide had been removed from the solution leaving the column, this solution had an overall composition corresponding to 10 g. $Na_2O$ as sodium hydrogen sulfide, 40 g. $Na_2O$ as sodium hydrogen carbonate and 70 g. $Na_2O$ as sodium carbonate together with 10 g. $Na_2O$ as other salts, per liter of solution, and a temperature of 100° C as a result of heating in the stripping step. From the solution entering the column 22 kg. of hydrogen sulfide were driven off per minute, the effluent gas being practically saturated with steam. The gas was cooled to separate the major portion of its water content and was mixed with a gas obtained as described below from the carbon dioxide purification step, so that a suitable concentration for the oxidation was obtained. After heating, the hydrogen sulfide was burnt in two steps with air, which was supplied in an amount below the stoichiometric, so that the effluent gas contained about 72% of carbon dioxide and 1% of hydrogen sulfide but was virtually free from sulfur oxides. Small amounts of carbon oxysulfide are permissible, however. After the sulfur had been separated in a conventional manner and the gas cooled to 40° C., whereby the major portion of the water and any traces of sulfur oxides were separated, the gas was washed in a scrubber with a cold solution of sodium carbonate, whereby the carbon dioxide and a portion of the hydrogen sulfide were absorbed. Residual gas was used for pretreating the green liquor as referred to above. The sodium bicarbonate solution was heated to 100° C. and was passed in a scrubber in countercurrent to a slow stream of steam to give off the major portion of its bicarbonate carbon dioxide and its hydrogen sulfide. The resulting carbon dioxide was supplied to the hydrogen sulfide stripper and as diluting gas to the Claus furnace, while the carbonate solution was cooled first with the bicarbonate solution to be heated and then with water, whereupon it was supplied to the carbon dioxide absorption step.

If sulfur dioxide is present in the gas, it will be bound as sulfite and after reaction with hydrogen sulfide as thiosulfate, which compounds cannot be decomposed by the heating and stripping steps described. A suitable amount of sodium carbonate solution must therefore be diverted, suitably to the carbonate solution leaving the hydrogen sulfide stripper. Instead of a sodium carbonate solution it is possible to use a potassium carbonate solution, which can be diverted in the same way, or a solution of ethanolamine in which case the diverted portion must be regenerated by the addition of chemicals. The economy of these more efficient but also more expensive solutions depends largely on how far the sulfur dioxide content of the gas from the Claus furnaces can be kept low.

The oxidation of the hydrogen sulfide can be carried out in two or more steps with addition of air to each step and cooling between them. The above described process is not limited to oxidation in a Claus furnace but other methods of converting the hydrogen sulfide into sulfur can be used.

What is claimed is:

1. A method of preparing a polysulfide-containing pulping liquor for use in the sulfate method of preparing cellulose pulp, which comprises using carbon dioxide for stripping hydrogen sulfide from a green liquor containing sodium sulfide and obtained from spent liquor produced in the sulfate pulping method, and thereby obtaining a stripped gas mixture comprising hydrogen sulfide and carbon dioxide, partially oxidizing to elemental sulfur the hydrogen sulfide in the stripped gas mixture, using air as the oxidizing agent, and thereby forming a mixture comprising elemental sulfur, carbon dioxide and hydrogen sulfide, separating the elemental sulfur from the gas mixture, treating the remaining gas mixture with a carbon dioxide absorbent, thereby removing carbon dioxide from the mixture, and obtaining a residual gas mixture comprising hydrogen sulfide and a small amount of carbon dioxide, separating carbon dioxide from the absorbent, recycling at least a portion of such carbon dioxide for stripping hydrogen sulfide from the green liquor, converting the recovered elemental sulfur to sodium polysulfide, and thereafter using the polysulfide to prepare a polysulfide-containing pulping liquor for the sulfate pulping method.

2. A method in accordance with claim 1 wherein the partial oxidation of the hydrogen sulfide in the hydrogen sulfide-carbon dioxide stripped gas mixture using air is carried out by using an amount of air which is less than that required to completely oxidize the hydrogen sulfide, so that the carbon dioxide in the mixture is diluted with only a small amount of oxygen.

3. A method in accordance with claim 1 including, in addition, recycling unoxidized hydrogen sulfide and any carbon dioxide present in the residual mixture back to the green liquor feed, thereby reusing substantially all of the hydrogen sulfide initially present in the green liquor and additional carbon dioxide which was initially used to strip the hydrogen sulfide from the green liquor.

4. A method in accordance with claim 1 including, in addition, the step of treating the residual gas mixture with a hydrogen sulfide absorbent to remove hydrogen sulfide therefrom and thereafter recycling the remaining carbon dioxide to the green liquor to be stripped.

5. A method in accordance with claim 1 including the step of recycling a portion of the carbon dioxide-recovered from the carbon dioxide absorbent, for use as a diluent for air used in partially oxidizing hydrogen sulfide to elemental sulfur.

6. A method in accordance with claim 1 wherein the partial oxidation of the hydrogen sulfide in the hydrogen sulfide-carbon dioxide stripped gas mixture is carried out by combusting the hydrogen sulfide with air.

7. A method in accordance with claim 6 wherein the partial oxidation of the hydrogen sulfide in the hydrogen sulfide-carbon dioxide stripped gas mixture is carried out in at least two steps, wherein air is added to the gas mixture to be oxidized in each step and the gases are cooled between each step.

References Cited by the Examiner

UNITED STATES PATENTS

| | | | |
|---|---|---|---|
| 1,934,472 | 11/1933 | Allen et al. | 23—150 |
| 1,945,163 | 1/1934 | Rosenstein et al. | 23—150 X |
| 2,758,913 | 8/1956 | Pearce | 23—225 |
| 2,800,388 | 7/1957 | Ahlborg et al. | 23—131 |

FOREIGN PATENTS

| | | |
|---|---|---|
| 798,331 | 7/1958 | Great Britain. |

OSCAR R. VERTIZ, *Primary Examiner.*

BENJAMIN HENKIN, *Examiner.*

H. S. MILLER, A. J. GREIF, *Assistant Examiners.*